United States Patent
Wierman et al.

(10) Patent No.: US 7,583,960 B2
(45) Date of Patent: *Sep. 1, 2009

(54) CONFIGURING A MOBILE DEVICE

(75) Inventors: Dean M. Wierman, Seattle, WA (US); Sarabjit Singh Seera, Redmond, WA (US); Sandhya D. Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

This patent is subject to a terminal disclaimer.

(21) Appl. No.: 11/156,719

(22) Filed: Jun. 20, 2005

(65) Prior Publication Data

US 2005/0245249 A1 Nov. 3, 2005

Related U.S. Application Data

(62) Division of application No. 10/630,503, filed on Jul. 30, 2003, now Pat. No. 6,976,253.

(51) Int. Cl.
*H04M 3/00* (2006.01)
*G06F 9/445* (2006.01)
*G06F 9/00* (2006.01)
*G06F 15/177* (2006.01)

(52) U.S. Cl. .................. 455/418; 455/419; 717/177; 717/178; 713/2

(58) Field of Classification Search .............. 455/418, 455/419; 717/177, 178; 713/2
See application file for complete search history.

(56) References Cited

U.S. PATENT DOCUMENTS

| 5,721,824 | A | 2/1998 | Taylor | 709/203 |
|---|---|---|---|---|
| 5,835,777 | A | 11/1998 | Staelin | 717/175 |
| 5,860,012 | A * | 1/1999 | Luu | 717/175 |
| 6,366,876 | B1 | 4/2002 | Looney | 703/25 |
| 6,484,309 | B2 | 11/2002 | Nowlin et al. | 717/100 |
| 6,571,290 | B2 | 5/2003 | Selgas et al. | 709/228 |
| 6,675,382 | B1 | 1/2004 | Foster | 717/177 |
| 7,043,263 | B2 * | 5/2006 | Kaplan et al. | 455/466 |
| 2003/0032406 | A1 | 2/2003 | Minear et al. | 455/410 |
| 2004/0015960 | A1 * | 1/2004 | Wanchoo et al. | 717/178 |
| 2004/0203941 | A1 * | 10/2004 | Kaplan et al. | 455/466 |

OTHER PUBLICATIONS

Grant Street Software, "GSS SD Deploy! Version 1.0," User's Guide, Apr. 2003.

(Continued)

*Primary Examiner*—Vincent P Harper
*Assistant Examiner*—Ariel Balaoing
(74) *Attorney, Agent, or Firm*—Theodore M. Magee; Westman, Champlin & Kelly, P.A.

(57) ABSTRACT

A method of configuring a mobile device allows an administrator to select multiple installation items from a set of possible installation items to include in a deployment package. At least one of the installation items includes parameters provided by an administrator that are requested from the administrator based on a configuration file associated with the installment items. The deployment package is transferred to a mobile device and the parameter values are extracted and are used to configure the mobile device.

8 Claims, 9 Drawing Sheets

OTHER PUBLICATIONS mi4e DMS Mobile Configurator, "Device Management Server (DMS)," http://mi4e.com/products/dms_admin.html, 2002.

Wavelink Corporation, "Avalanche 3.0 Mobile Device Management How It Works," Revised Sep. 18, 2002.

mi4e Press Release, "Teligent and mi4e Introduce Market Leading MMS Capabilities at the 3GSM Wor Congress," http://www.mi4e.com/news/mms_teligent.html, Feb. 19, 2002.

Office Action of Jun. 6, 2005 for U.S. Appl. No. 10/630,503, filed Jul. 30, 2003.

* cited by examiner

CONFIGURING A MOBILE DEVICE

REFERENCE TO RELATED APPLICATION

This application is a divisional of and claims priority from U.S. patent application Ser. No. 10/630,503, filed on Jul. 30, 2003 and entitled "METHOD AND APPARATUS FOR CONFIGURING A MOBILE DEVICE", which is hereby incorporated by reference.

BACKGROUND OF THE INVENTION

The present invention relates to mobile devices. In particular, the present invention relates to configuring mobile devices.

Before mobile devices, such as web-enabled phones and personal digital assistants, can connect to a network or execute certain applications, they must be configured with parameters for functions such as network connectivity, security certificates, and communication connectivity. These parameters can include Internet Provider (IP) addresses, gateways, proxies, encryption, and protocols.

In the past, users have been forced to key this information into the mobile device. Because of the arcane nature of many of these parameters, this step has been very difficult for users because they do not understand what the parameters signify or which parameters are critical to proper operation of their device. In addition, the large number of parameters and the difficulty of inputting text in many mobile devices have made this task burdensome on users.

In addition, if a mobile device is left without power for too long, the parameters stored in its memory will be lost. When this happens, the user must re-enter their configuration information. Many times, users simply stop using the device instead of tackling this daunting task.

To solve this problem, one system under the prior art sets the configuration of a plurality of mobile devices based on a template mobile device. Under this system, the template mobile device is configured as desired by a system administrator. This configuration is copied onto a memory card such as a Secure Digital (SD) card. The memory card is then inserted into each of the mobile devices and automatically copies all of the applications and configuration settings of the template mobile device onto the target mobile device.

One limitation of such systems is that they do not allow the system administrator to select from previously configured software when configuring the template mobile device. As such, each time the administrator wants to create a new template mobile device, they must perform all of the steps of configuring that device. There is no repository of individually configured applications or settings that the administrator can select from. In addition, such systems do no allow for selective upgrading of mobile devices since the entire device must be overwritten in order to obtain the upgrade.

In other systems, mobile devices are configured through a network link between the mobile device and a central server. Under such systems, the mobile device must first be configured so that it can make the network connection and so that it knows where to find future configuration information. Every time the mobile device connects to the network, it checks for updates to its configuration. These updates are downloaded to the device and automatically change the configuration of the device.

Such systems do not allow configuration items to be selected and combined in a single deployed package. As a result, the mobile device must receive multiple separate packets in order to complete the configuration process. In addition, such systems do not allow for "off-line" configuration because they require a network connection.

SUMMARY OF THE INVENTION

A method of configuring a mobile device allows an administrator to select multiple installation items from a set of possible installation items to include in a deployment package. At least one of the installation items includes parameters provided by an administrator. The deployment package is transferred to a mobile device and the parameter values are extracted and are used to configure the mobile device. Under some embodiments, the parameter values are requested from the administrator based on a configuration file that the administrator selects to associate with the installation item.

DETAILED DESCRIPTION OF ILLUSTRATIVE EMBODIMENTS

Figure 1:
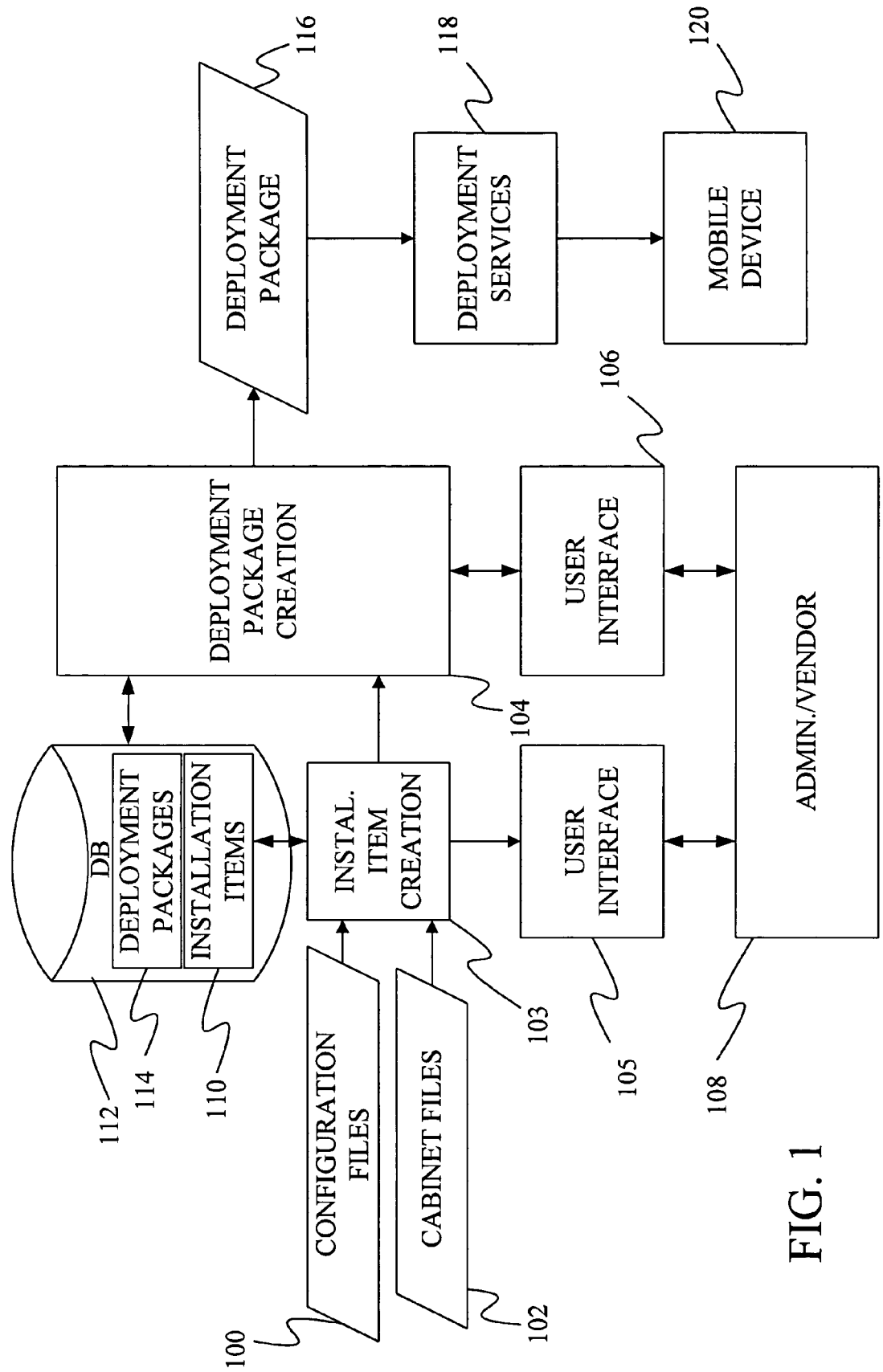
FIG. 1 is a block diagram of a system for configuring a mobile device under one embodiment of the present invention.
Figure 2:
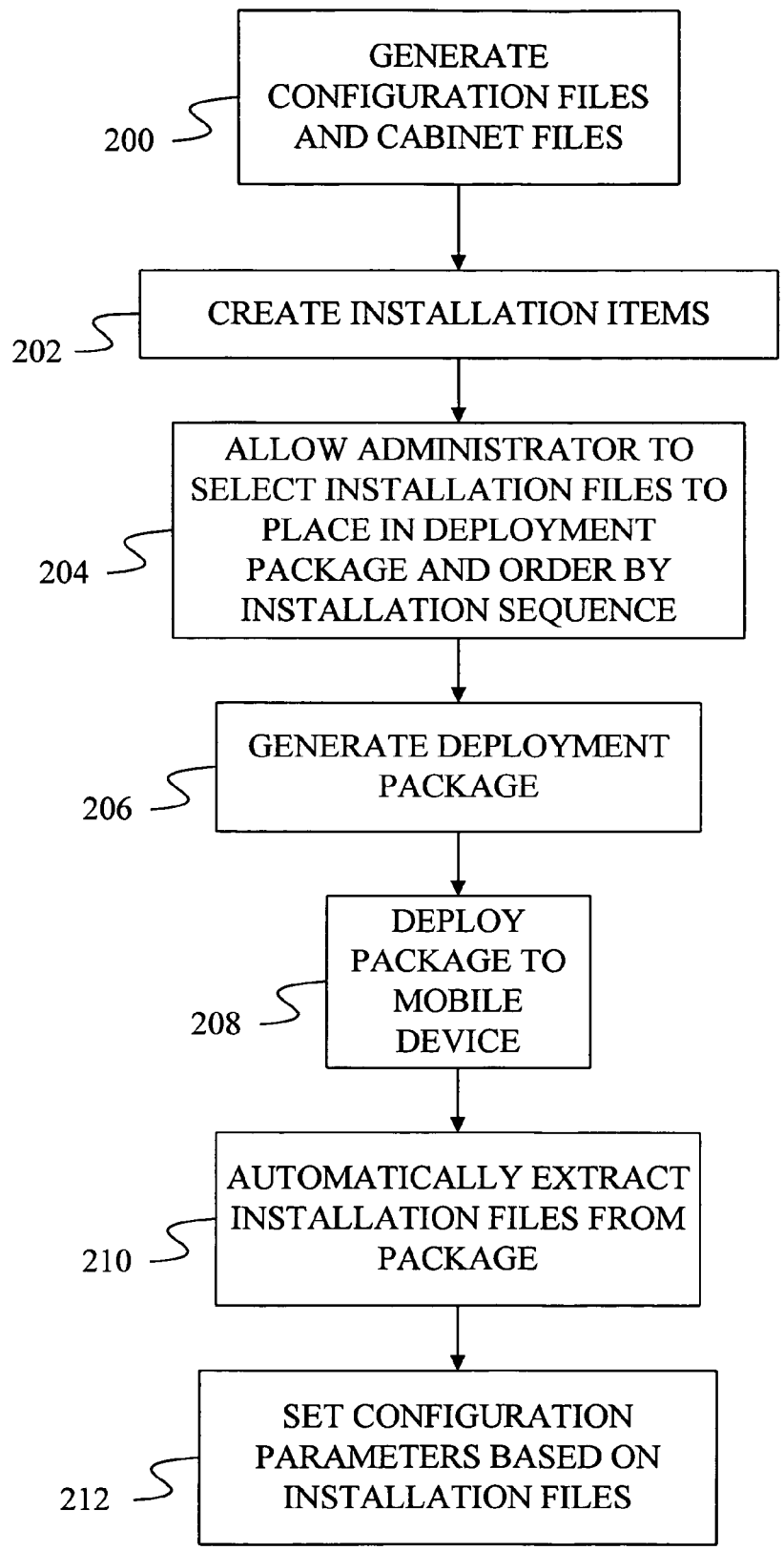
FIG. 2 is a flow diagram of a method of configuring a mobile device under one embodiment of the present invention.

FIG. 1 is a block diagram of a system for configuring a mobile device without requiring a user to enter configuration parameter values. FIG. 2 provides a flow diagram of a method performed by the system of FIG. 1 to configure a mobile device. In general, the method involves combining configuration information for multiple applications and network systems into a single deployment package, delivering the deployment package to the mobile device, and automatically configuring the mobile device by executing or extracting the deployment package.

This method begins at step 200 of FIG. 2, where a set of configuration files 100 and cabinet files 102 are created by an application or network programmer. The cabinet files 102 are compressed binary folders of files. Typically, cabinet files are compressed using Lempel-Ziv encoding. However, other folder compression techniques may be used under the present invention. Each cabinet file 102 automatically installs one or more applications when extracted. Configuration files 100 provide the name of parameters that must be solicited from the administrator during creation of the deployment package.

The information provided by the administrator is embedded in the deployment package and is used during the configuration of the mobile device.

Once cabinet files 102 and configuration files 100 have been created, an installation item creation program 103 is executed at step 202 by an administrator or a vendor 108 responsible for configuring the mobile devices. Installation item creation program 103 provides a user interface 105 that allows the administrator 108 to create an installation item.

This involves selecting a configuration file from configuration files 100 and a corresponding cabinet file from cabinet files 102. Under some embodiments, after the administrator selects the configuration file, the configuration file is examined to determine which parameter values are needed to create the installation file. Based on the parameters listed in the configuration file, installation item creation program 103 generates a set of screens on user interface 105 to solicit the needed values from administrator 108. For example, for a theme application that indicates the design of icons and windows on the mobile device, the configuration file may indicate that the administrator must select a theme and whether the theme is to be changed automatically or remain static.

Once administrator 108 has provided the values required by the configuration file, the information is placed in an XML file that forms at least part of the installation item. Under one embodiment, a simple schema is provided for the XML file where each parameter is stored in a parameter tag that contains a name attribute, which is the name of the parameter, and a value attribute, which is the value of the parameter. The cabinet file and the XML file are grouped as a single installation item that is stored in a set of installation items 110 in a database 112.

In addition to installation items created by the administrator, installation items 110 also includes a collection of system defined installation items such as General Purpose Radio Service (GPRS), Security Certificates, Internet e-mail, Exchange e-mail, virtual private networking, proxies, mappings, and registry settings. For each of these system installation items, it assumed that the mobile device already contains the applications and that the installation items simply provide the configuration information for those applications. The configuration files for the system installation items do not need to be created or designated by the administrator since they are shipped as part of the configuration system of the present invention.

Although specific applications have been discussed above, the present invention may be used to set the parameters of any settings on the mobile device and to install any desired applications.

At step 204, package creation program 104 generates a set of screens on user interface 106 that allows the administrator to select installation items 110 from database 112 to include in a deployment package. This interface allows the administrator to place the installation items in a sequence that represents the order in which the items should be extracted and installed. Thus, the first installation item in the sequence will be the first that is extracted on the mobile device. User interface 106 also allows the administrator to designate the mode of delivering the deployment package to the mobile device. In some embodiments, this information influences the content or form of the deployment package.

For system installation items, the administrator sets the properties of the system installation item after adding the system installation to the deployment package. For example, for GPRS, the administrator can set the name of the GPRS connection, the access point name, the user name for the user of the mobile device, and the password. The administrator can also modify the properties of application installation items even though those properties may have been set when the installation items were created and stored in database 112.

Based on the information gathered from administrator 108, a deployment package is formed at step 206 by placing the selected installation items, and in some embodiments, additional setup files, into a new cabinet file. Thus, multiple installation items that had been previously compressed are compressed again into a single deployment package. The resulting deployment package is stored in database 112 in a set of deployment packages 114 and is provided to a deployment service 118 as deployment package 116.

At step 208, deployment services 118, deploy the package to the mobile device 120. As discussed in more detail below, possible modes of deployment include pass-through deployment where the package is retrieved by a personal computer that is connected to the mobile device, Secure Digital (SD) card deployment where the package is written to a memory card that is inserted into the mobile device, and web services deployment, where an agent installed on the mobile device locates and acquires the package on a network such as the Internet.

Once the deployment package is received at mobile device 120, it is executed or extracted (depending on the mode of delivery) at step 210. This causes each installation item in the deployment package to be extracted thereby configuring the mobile device by setting various parameters and installing applications (if present in the installation item) at step 212.

Figure 3:
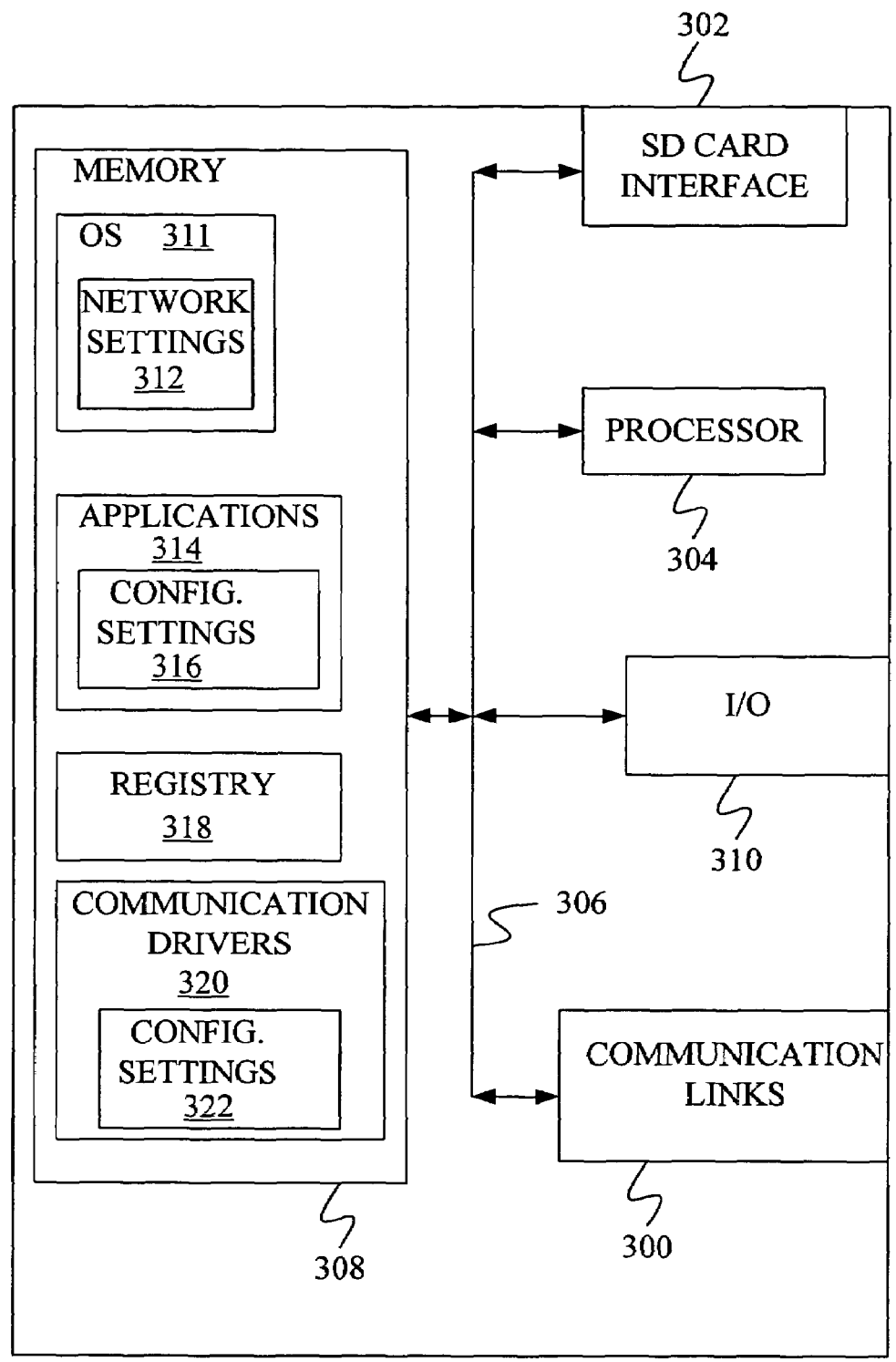
FIG. 3 is a general block diagram of a mobile device.

FIG. 3 provides a general block diagram of the components of the mobile device that receive and install the deployment package. In the mobile device, a communications link 300 is provided that allows the mobile device to communicate with other computing devices and under some deployment modes provides a channel for receiving the deployment package. Examples of communications link 300 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth protocol, which provide local wireless connections to networks.

Under other deployment modes, the deployment package is received on a removable Secure Digital (SD) card that is connected to a SD card interface 302.

SD card interface 302 and communication links 300 communicate with a processor 304 along a bus 306 that is also connected to memory 308 and input/output (I/O) components 310.

I/O components 310, in one embodiment, are provided to facilitate input and output operations. I/O components 310 for various embodiments of the mobile device can include input components such as buttons, touch sensors, touch screens, proximity sensors, microphones, tilt sensors, GPS detectors, and gravity switches and output components such as a display, a speaker, and or a printer port.

Memory 308 stores operating system 311, network settings 312, applications 314, application configuration settings 316, registry 318, communication drivers 320, and communication configuration settings 322.

Network settings 312, application configuration settings 316, registry 318 and communication configuration settings 322 may be set using the information in a deployment package. Examples of the network settings include things such as proxy information, Internet connection information, and mappings. Application configuration settings include settings that tailor the application for a specific enterprise or user. Communication configuration settings 322 provide parameters for communicating with other computers and include items such as GPRS parameters, SMS parameters, connection user names and passwords.

Applications 314 can be applications that have previously been stored on the mobile device or applications that are installed through a deployment package. For applications that are installed through a deployment package, the configuration settings 316 will typically be set in the same deployment package.

Figure 4:
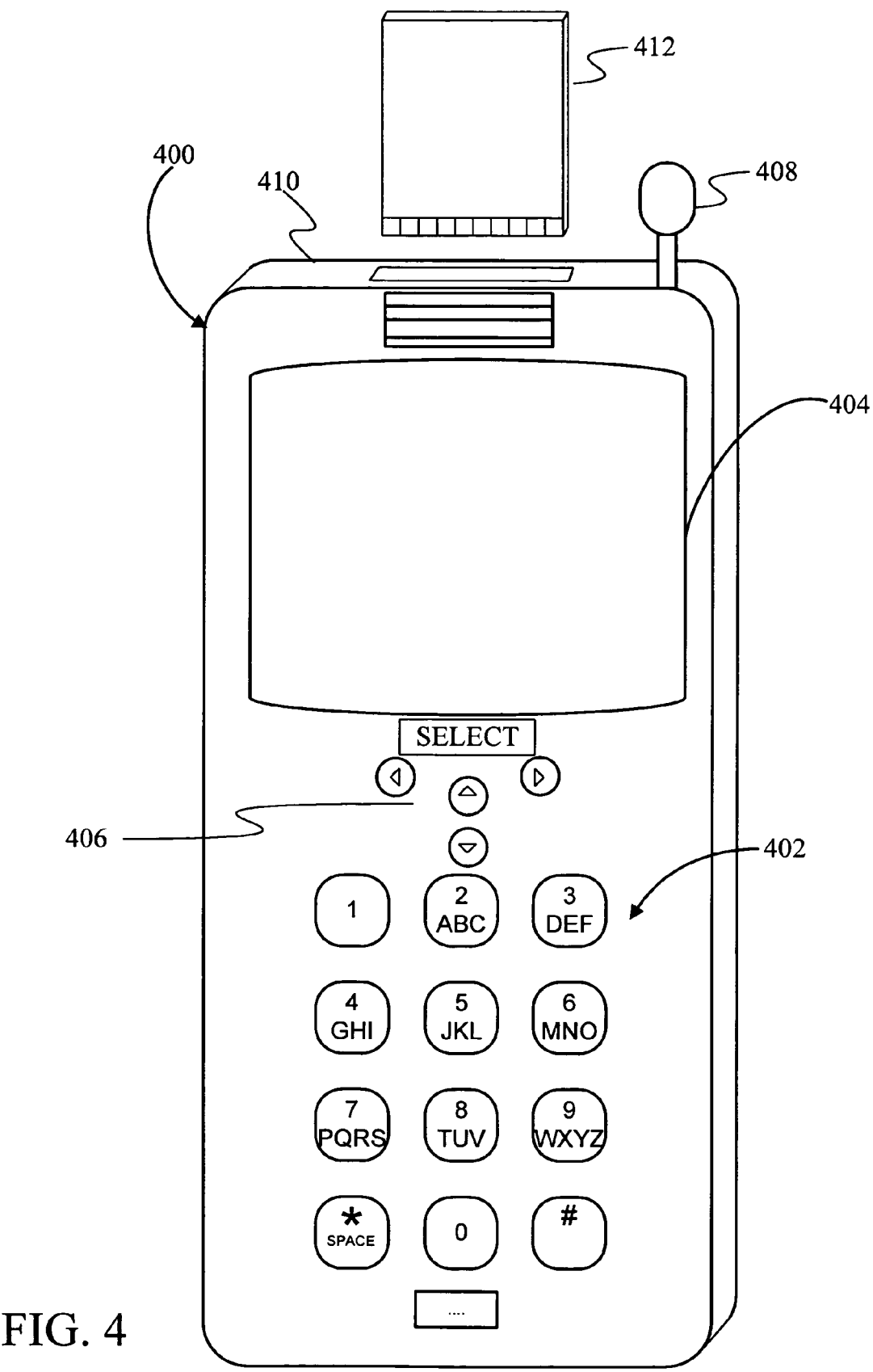
FIG. 4 is a phone embodiment of a mobile device that may be used with the present invention.
Figure 5:
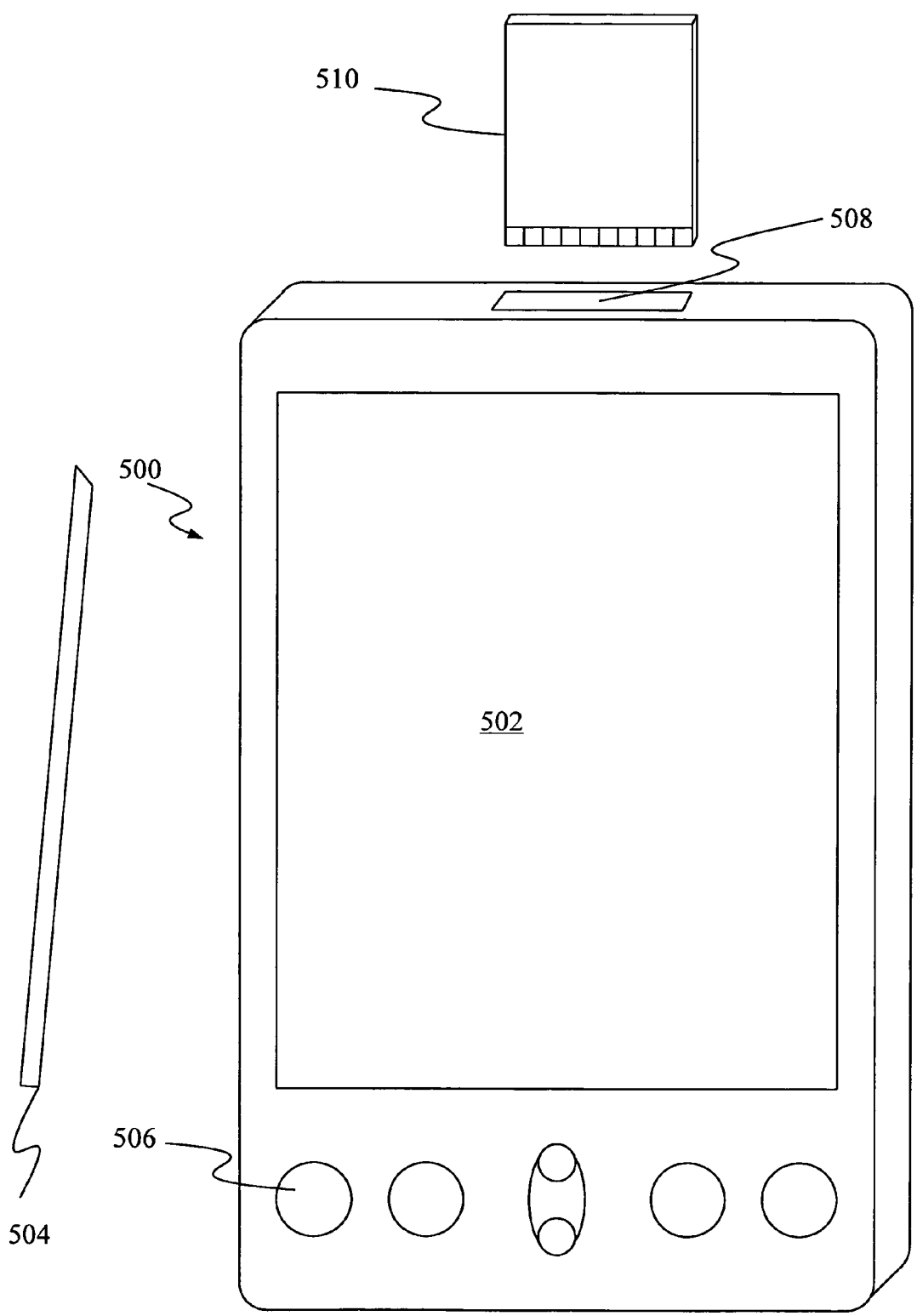
FIG. 5 is a personal digital assistant embodiment of a mobile device that may be used with the present invention.

FIGS. 4 and 5 provide examples of mobile devices that can be used with the present invention. In FIG. 4, a mobile phone 400 is provided as the mobile device. Phone 400 includes a set of keypads 402 for dialing phone numbers, a display 404 capable of displaying images including application images, web pages, photographs, and video, and control buttons 406 for selecting items shown on the display. The phone includes an antenna 408 for receiving cellular phone signals such as General Packet Radio Service (GPRS) and 1Xrtt, and Short Message Service (SMS) signals. In some embodiments, phone 400 also includes a Secure Digital (SD) card slot 410 that accepts a SD card 412.

The mobile device of FIG. 5 is a personal digital assistant (PDA) 500. PDA 500 includes an inductive screen 502 that senses the position of a stylus 504 when the stylus is positioned over the screen. This allows the user to select, highlight, and move items on the screen as well as draw and write. Mobile device 500 also includes a number of user input keys or buttons (such as button 506) which allow the user to scroll through menu options or other display options which are displayed on display 502, and allow the user to change applications or select user input functions, without contacting display 502. Although not shown, PDA 500 includes an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 500 also includes a SD card slot 508 that accepts a SD card 510.

Note that other forms of the mobile device are possible under the present invention. Examples include tablet PCs and wireless-enabled lap-top computers.

Figure 6:
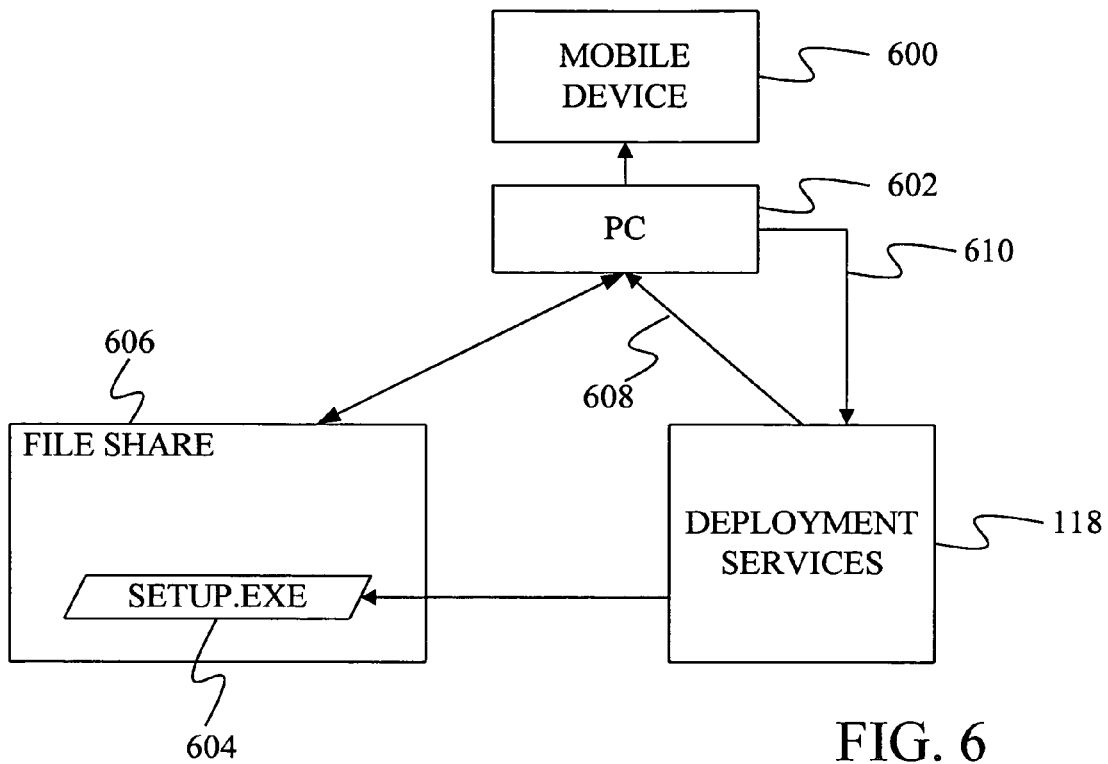
FIG. 6 is a block diagram of one deployment mode for deploying a configuration package to a mobile device.

FIG. 6 provides a block diagram of one deployment mode under the present invention that allows a deployment package to be sent to a mobile device 600 through a personal computer 602. In FIG. 6, deployment services 118 sends a deployment package 604 to a file share server 606. Deployment services 118 also sends a notification 608, such as an e-mail, to personal computer 602 that indicates the location of deployment package 604. For example, if file share server 606 is located on the Internet, the location can be a link to the URL of deployment package 604.

Upon receiving notification 608, the user connects mobile device 600 to personal computer 602 using a non-network hardware connection such as a cradle or a wireless connection such as an infrared connection. Once mobile device 600 is connected to personal computer 602, personal computer 602 retrieves deployment package 604 from file share server 606 and installs the deployment package on mobile device 600. Mobile device 600 then executes the deployment package and thereby configures itself.

Under one embodiment of the invention, during execution of the deployment package an error log is created to record errors that occur. Once execution of the deployment package is complete, an indication of success or failure, together with the error log if there were errors, is sent from personal computer 602 to deployment services 118. This is indicated by communication path 610, which is typically through an internet connection.

Figure 7:
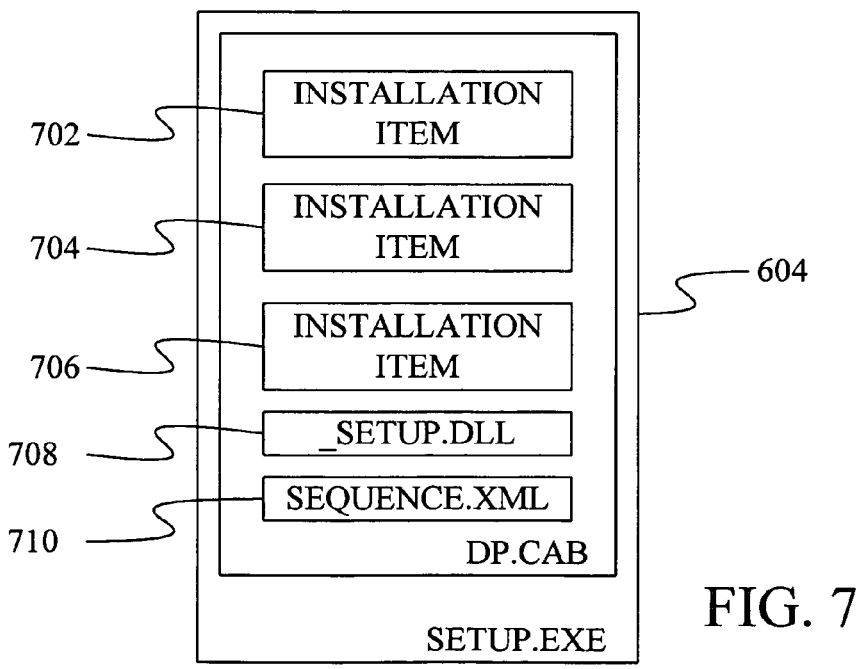
FIG. 7 is a diagram of the content of a deployment package that is sent in the block diagram of FIG. 6.

FIG. 7 provides an example of the contents of a deployment package 604 that would be used in the deployment mode of FIG. 6. In FIG. 7, deployment package 604 is configured as a "setup" executable that includes a sequence of installation items 702, 704, and 706 as well as a "_setup.dll" file 708 and a "Sequence.xml" file 710. When deployment package 604 is executed on mobile device 600, "_setup.dll" file 708 executes and extracts installation items 702, 704, and 706 in an order determined by "Sequence.xml" file 710. "_setup.dll" file 708 also creates an error log and inserts errors into the log if any errors are encountered while extracting the installation items. During extraction of the installation items, the cabinet files for the applications are extracted and stored on the mobile device and the configuration settings in the XML file are used to set the parameters associated with the application. For system installation items, the associated XML file is used to set the parameters of an application that is already installed on the mobile device.

Figure 8:
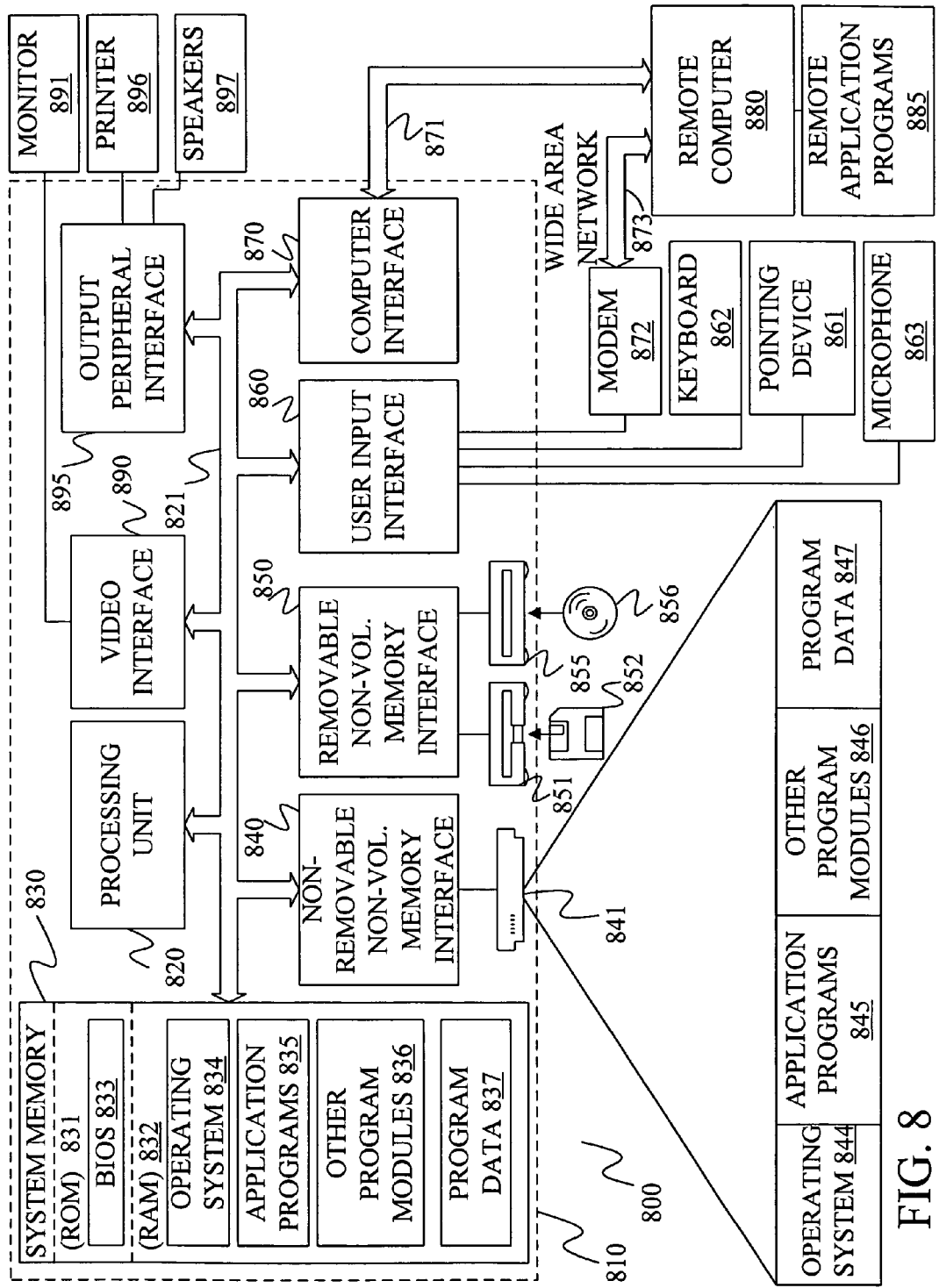
FIG. 8 is a block diagram of a personal computer used in the deployment mode of FIG. 6.

FIG. 8 illustrates an example of a suitable computing system environment 800 that can be used as personal computer 602 in FIG. 6. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

With reference to FIG. 8, an exemplary system for implementing the invention includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, memory cards such as Secure Digital cards or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 can be operated through logical connections to one or more remote computers, such as a remote computer 880. The remote computer 880 may be a mobile device such as mobile device 600 of FIG. 6, a personal computer, a hand-held device, a server, a router, a network PC, a peer device or other common network node, and typically includes many or all of the elements described above relative to the computer 810. The logical connections 871 and 873 depicted in FIG. 8 can include a local area network (LAN) and a wide area network (WAN), but may also include other types of connections such as radio wireless, infrared, and serial/USB. Such interconnected environments are commonplace in offices, enterprise-wide computer networks, intranets and the Internet.

Logical connections 871 are made through a computer interface or adapter 870, while logical connections 873 are made through a modem 872, which may be internal or external, and may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Figure 9:
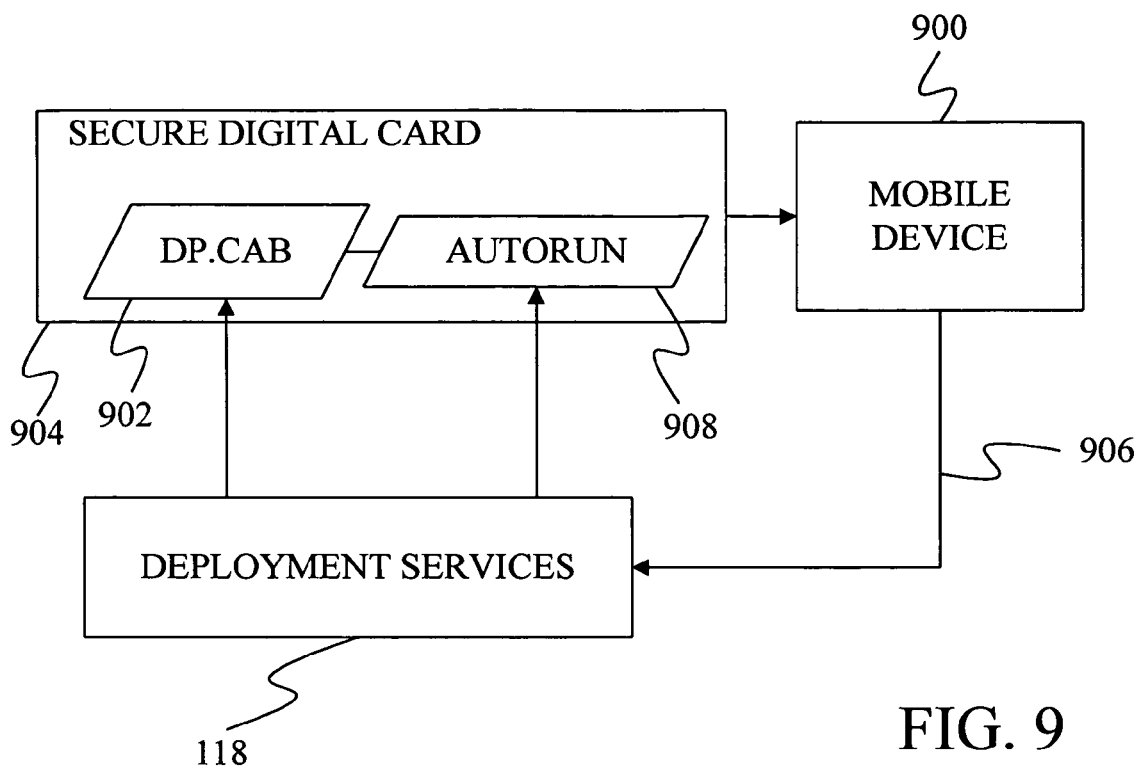
FIG. 9 is block diagram of an alternative deployment mode for deploying a configuration package to a mobile device.

FIG. 9 provides a block diagram of an alternative deployment mode for transferring a deployment package to a mobile device 900. In FIG. 9, deployment services 118 places the deployment package 902 and an autorun executable 908 on a Secure Digital (SD) card 904. Card 904 is then inserted into mobile device 900, causing autorun executable 908 to execute deployment package 902 to extract the files stored in deployment package 902 and thereby configure mobile device 900. Any errors in the process are returned in a log file to deployment services 118 along a communication channel 906. Note that the communication channel will typically only be available if at least one of the installation items was able to configure the communication channel parameters on mobile device 900 or the network has already been configured and is working.

Figure 10:
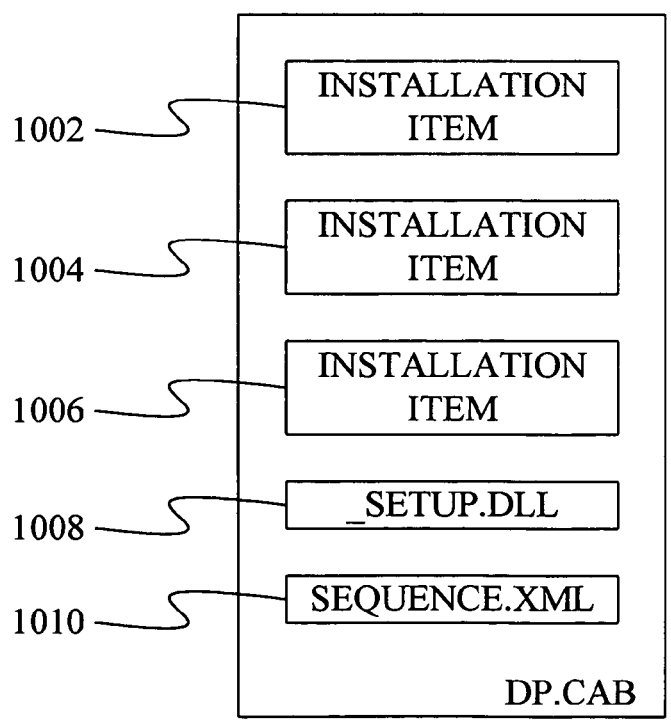
FIG. 10 is a diagram of the content of a deployment package that is sent in the block diagram of FIG. 9.

FIG. 10 provides an example of the contents of deployment package 902. In FIG. 10, deployment package 902 takes the form of a cabinet file that includes a set of installation items 1002, 1004, and 1006 as well as a "_setup.dll" file 1008 and a "Sequence.xml" file 1010. Upon receiving deployment package 902, mobile device 900 extracts "_setup.dll" file 1008 and executes this file. "setup.dll" file 1008 then extracts installation items 1002, 1004, and 1006 in an order determined by "Sequence.xml" file 1010. "_setup.dll" file 1008 also creates an error log and inserts errors into the log if any errors are encountered while extracting the installation items.

Figure 11:
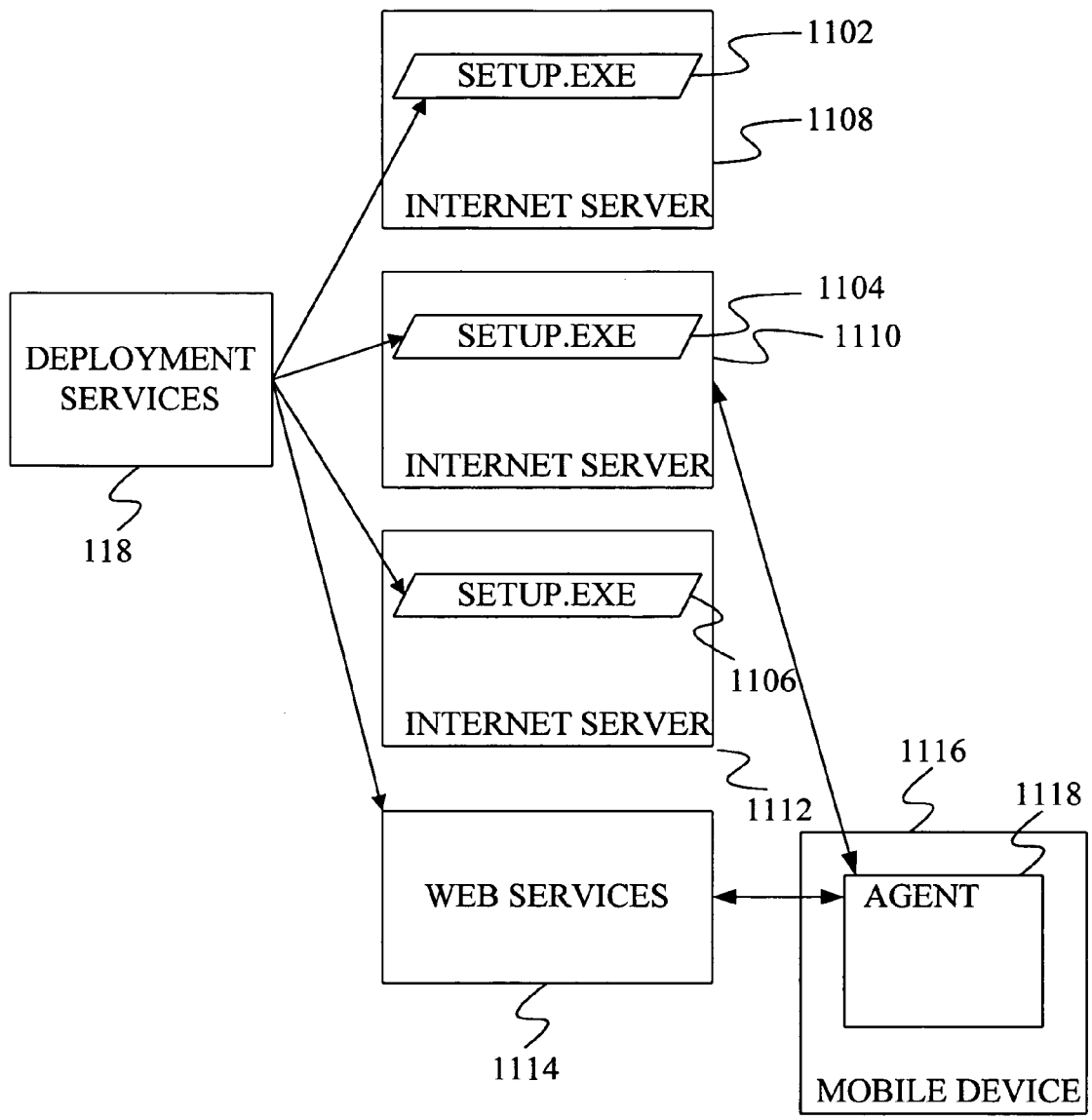
FIG. 11 is a block diagram of an alternative deployment mode for deploying a configuration package to a mobile device.

FIG. 11 is a block diagram of another alternative delivery mode under an embodiment of the present invention. In FIG. 11, deployment services 118 place copies 1102, 1104, and 1106 of the deployment package on a set of Internet servers 1108, 1110, and 1112. Deployment services 118 also provide information to web services 1114 that indicates a username or a set of usernames that are to be given access to the deployment package. This information can optionally include passwords that must be provided to obtain access to the deployment package.

Mobile device 1116 includes an agent 1118 that establishes a communication link with web services 1114. After authenticating agent 1118, web services 1114 provides the location of the closest server containing the deployment package to agent 1118. Agent 1118 then retrieves the deployment package from that server and executes the package to configure mobile device 1116. For example, in FIG. 11, agent 1118 retrieves deployment package 1104 from server 1110. In one embodiment, the deployment packages used in the delivery mode of FIG. 11 are constructed in the same manner as the deployment packages of FIG. 7 described above.

Because agent 1118 must communicate with web services 1114 and internet servers such as server 1110, mobile device 1116 must at least be configured to allow for such communications. This configuration can be performed during the manufacturing of the device, can be performed manually by the user, or can be performed using one of the other modes of delivery discussed above in connection with FIGS. 6 and 9.

Note that although the present invention has been described above in connection with initial configurations of mobile devices, the invention can also be used to reconfigure a device that lost its configuration information or to change the configuration of the device. For example, if the proxy used by the mobile device changes, the new proxy information can be placed in a deployment package and sent to the mobile device.

By providing a means for administrators to define and save multiple installation items, each with their own configuration, the present invention allows administrators to easily form tailored deployment packages that are a combination of multiple previously defined installation items. This allows the administrator to reuse installation items in different deployment packages thereby avoiding the need to reconfigure each part of a new deployment package.

Although the present invention has been described with reference to particular embodiments, workers skilled in the art will recognize that changes may be made in form and detail without departing from the spirit and scope of the invention.

What is claimed is:

1. A method of configuring a mobile device, the method comprising:
    creating a first installation item based on a first set of parameter values provided by an administrator wherein creating the first installation item comprises:
        providing a user interface to the administrator to select a configuration file and a corresponding cabinet file from a set of configuration files and a set of cabinet files;
        examining the selected configuration file to identify parameter values that must be determined;
        soliciting the parameter values from the administrator based on the selected configuration file by generating a set of screens on a user interface;
        acquiring the parameter values from the administrator;
        incorporating the parameter values and the cabinet file into the installation item; and
        storing the first installation item;
    creating a second installation item based on a second set of parameter values provided by the administrator wherein creating the second installation item comprises:
        providing a user interface to the administrator to select a second configuration file and a corresponding second cabinet file from the set of configuration files and a set of cabinet files;
        examining the selected second configuration file to identify parameter values that must be determined;
        soliciting the parameter values from the administrator based on the second selected configuration file by generating a set of screens on a user interface;
        acquiring the parameter values from the administrator;
        incorporating the parameter values and the second cabinet file into the second installation item; and
        storing the second installation item;
    providing a user interface to the administrator to select one of either the first installation item or the second installation item as a selected installation item to include in a deployment package;
    creating a deployment package based on the selected installation item and at least one other installation item that is based on parameter values provided by the administrator;
    transferring the deployment package to the mobile device; and
    extracting the parameter values provided by the administrator from the deployment package and configuring the mobile device based on the parameter values.

2. The method of claim 1 wherein the parameter values comprise a network parameter used to establish a network connection on the mobile device.

3. The method of claim 1 wherein the parameter values comprise a communication parameter used to establish a wireless connection to the mobile device.

4. The method of claim 1 wherein the first installation item further comprises an application and the parameter values comprise an application parameter associated with the application.

5. The method of claim 1 wherein transferring the deployment package comprises storing the deployment package on a computer-readable medium and inserting the computer-readable medium in the mobile device.

6. The method of claim 1 wherein transferring the deployment package comprises connecting the mobile device to a computing device through a non-network connection, transferring the deployment package to the computing device and transferring the deployment package from the computing device to the mobile device across the non-network connection.

7. The method of claim 1 wherein transferring the deployment package comprises storing the deployment package on a network server, providing the location of the deployment package to the mobile device, and sending the deployment package from the network server to the mobile device based on a request from the mobile device.

8. The method of claim 1 wherein creating a deployment package comprises:
    selecting at least two installation items; and
    compressing a combination of the at least two installation items to produce the deployment package.

* * * * *